US 6,647,098 B2

(12) United States Patent
Sakai et al.

(10) Patent No.: US 6,647,098 B2
(45) Date of Patent: Nov. 11, 2003

(54) SYSTEM AND DEVICE FOR COMMUNICATIONS

(75) Inventors: Takahisa Sakai, Amagasaki (JP); Yuji Mizuguchi, Hirakata (JP); Noboru Katta, Itami (JP); Hirotsugu Kawada, Sakai (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 133 days.

(21) Appl. No.: 09/969,645

(22) Filed: Oct. 4, 2001

(65) Prior Publication Data
US 2002/0041661 A1 Apr. 11, 2002

(30) Foreign Application Priority Data
Oct. 5, 2000 (JP) ........................................ 2000-306490

(51) Int. Cl.[7] .............................................. H04M 11/00
(52) U.S. Cl. .................................. 379/93.01; 379/93.08
(58) Field of Search .......................... 379/93.08, 93.01, 379/93.05, 93.28, 93.31, 93.32, 93.34, 90.01; 375/222

(56) References Cited

U.S. PATENT DOCUMENTS 5,790,641 A * 8/1998 Chan et al. .............. 379/93.31
5,796,808 A * 8/1998 Scott et al. .............. 379/93.31
5,910,978 A * 6/1999 Maytal et al. ........... 379/93.01

FOREIGN PATENT DOCUMENTS

JP          04-181837       6/1992
JP          10-135999       5/1998
JP       2000324107 A   *  11/2000     ........... H04L/12/28

* cited by examiner

Primary Examiner—Stella Woo
(74) Attorney, Agent, or Firm—Wenderoth, Lind & Ponack, L.L.P.

(57) ABSTRACT

A communications system and a communications device are provided that can reduce the difference in data reaching time with a simple structure and can play audio without making listeners feeling strange. A communications device 105 is coupled to a network 101 and a device 106 such as a CD player or the like. The communications device 105 includes a network interface unit 100, a network controller 103 communicating with the device 106 and others, and a CPU controlling these components. Furthermore, the network interface unit 100, a transmission signal processing unit 107 and a reception signal processing unit 108 converts the data format appropriate for the network controller 103 and the network 101, respectively. A transmission scheme determination unit 102 determines the transmission scheme used among nodes. First and second switches 109 and 110 each have a contact A and a contact B, connecting either one of these contacts based on a control signal from the transmission scheme determination unit 102.

5 Claims, 8 Drawing Sheets

SYSTEM AND DEVICE FOR COMMUNICATIONS

BACKGROUND OF THE INVENTION

1. Field of the Invention

The present invention relates to communications devices and communications systems connected to a device for data transmission/reception and, more specifically, a communications device and a communications system connected to a device and capable of switching a data transmission scheme among nodes.

2. Description of the Background Art

A conventional communications device is described with reference to the drawings. FIG. 8 is a block diagram showing the structure of the conventional communications device. In FIG. 7, a communications device 604 forms one node including a network interface unit 600, a network controller 602, and a CPU (Central Processing Unit) 603.

The network controller 602 transmits/receives data to/from a device 605, such as a CD (Compact Disk) player or a speaker, that is connected to the communications device 604. The network controller 602 also transmits/receives data to/from devices of other nodes through the network interface unit 600. The CPU 603 controls the network controller 602, and communicates with the device 605 and the network controller 602.

The network interface unit 600 is coupled to a network 601, and includes a transmission signal processing unit 606 and a reception signal processing unit 607. The transmission signal processing unit 606 converts data outputted from the network controller 602 into data in a predetermined transmission format appropriate for use over the network 601. The reception signal processing unit 607 converts the data in the transmission format received through the network 601 into data processable by the network controller 602.

FIG. 8 is a block diagram illustrating an exemplary case where six nodes similar in structure to the communications device 604 shown in FIG. 7 are coupled to each other, forming a ring shape network. In FIG. 8, first to sixth nodes 701 to 706 are coupled to each other via the network 601 by each connecting to its adjacent nodes, thereby forming a ring-typed network. Also, the first to sixth nodes 701 to 706 are respectively connected to corresponding first to sixth devices 751 to 756 for communications over the network 601.

In FIG. 8, data outputted from the first device 751 such as a CD player is supplied to the first node 701, and then forwarded to the second node 702 through the network 601. If the destination of the data is not the second node 702, the second node 702 forwards the data to the third node 703. In this manner, the data is transferred clockwise until it reaches the destination.

Consider a case, for example, where the third device 753 is a right speaker and the fifth device 755 is a left speaker. In this case, right and left audio data outputted from the first device 751 such as a CD player is forwarded, through the first node 701 and the second node 702, to the third node 703. In the third node 703, audio data for the right speaker is extracted, and then forwarded to the third device 753. The right and left audio data is further forwarded through the fourth node 704 to the fifth node 705. In the fifth node 705, audio data for the left speaker is extracted, and then forwarded to the fifth device 755.

Here, in the communications device 604 shown in FIG. 7, the transmission signal processing unit 606 and the reception signal processing unit 607 each require some time for processing signals. Also, the network controller 602 requires some processing time. Furthermore, communications with the device 605 requires a predetermined time. Therefore, if the first to sixth nodes 701 to 706 similar in structure to the device 604 are coupled in a ring shape as shown in FIG. 8, a time lag occurs between the time when data outputted from the first node 701 reaches the third node 702 and the time when the data reaches the fifth node 705.

More specifically, if the output data from the first node 701 is digital stereo audio data, a time lag occurs between the time when right audio data reaches the third device 753 and the time when left audio data reaches the fifth device 755. As a result, right audio and left audio are reproduced with a time lag, sounding strange to listeners. This also occurs in the case of three or more speakers, even more than in the case of two speakers.

To reduce such time lag, a predetermined delay is applied to the device (or node) side which data should reach earlier. However, if the lag varies with changes of the data transmission scheme or other factors, the predetermined fixed delay cannot be used.

SUMMARY OF THE INVENTION

Therefore, an object of the present invention is to provide a communications system and a communications device that can accurately correct, with a simple structure, a delay to be applied in order to reduce the difference in reaching time of data that should simultaneously reach respective destinations, thereby providing audio reproduction without making listeners feel strange.

The present invention has the following features to attain the object above.

A first aspect of the present invention is directed to a communications system comprising a plurality of nodes including at least one transmission scheme variable node that selects a transmission scheme for use from a plurality of transmission schemes, and a network coupling the transmission nodes, wherein the transmission scheme variable node carries out communications for transmitting, before using the selected transmission scheme, information about the selected transmission scheme to another node by using a previously set transmission scheme, thereby correcting reaching times of data that should almost simultaneously reach respective two or more different nodes.

As described above, in the first aspect, it is possible, with a simple structure, to accurately correct a delay to be applied in order to reduce the difference in reaching time of data that should simultaneously reach respective destinations, such as data for the right speaker and data for the left speaker. Thus, a communications system capable of reproducing audio without making listeners feel strange.

According to a second aspect, in the first aspect,
the transmission scheme variable node includes
a network controller for communicating with a device externally provided, and controlling data communications with the other node;
a central processing unit for controlling the network controller for communications;
a transmission signal processing unit for converting data coming from the network controller into a transmission signal over the network;
a reception signal processing unit for converting a reception signal received over the network into data processable by the network controller;

a transmission scheme determination part for selecting the transmission scheme for use in the transmission signal processing unit and reporting information about the selected transmission scheme to the other node, and setting the transmission scheme for use in the transmission signal processing unit and the reception signal processing unit; and a switching unit for switching, after the information about the transmission scheme selected by the transmission scheme determination part is transmitted to the other node, connection of the transmission signal processing unit and the reception signal processing unit to the network.

As described above, in the second aspect, even if the transmission scheme is changed in each node, the information about the transmission scheme for use is transmitted to another node, thereby accurately correcting the delay to be applied in order to reduce the difference in reaching time of data that should simultaneously reach respective destinations.

According to a third aspect, in the second aspect, the central processing unit receives the information about the transmission scheme selected by the transmission scheme determination part, and calculates a delay time for correcting the reaching time of the data.

As described above, in the third aspect, only with transmission of the information about the transmission scheme, the delay time can be correctly calculated by the central processing unit.

A fourth aspect is directed to a communications device for carrying out communications for transmitting, before using a transmission scheme selected from a plurality of transmission schemes, information about the selected transmission scheme to another node by using a previously set transmission scheme, thereby correcting reaching times of data that should almost simultaneously reach respective two or more different nodes coupled to each other via a network, and the communications device includes:

a network controller for communicating with a device externally provided, and controlling data communications with the other node;

a central processing unit for controlling the network controller for communications;

a transmission signal processing unit for converting data coming from the network controller into a transmission signal over the network;

a reception signal processing unit for converting a reception signal received over the network into data processable by the network controller;

a transmission scheme determination part for selecting a transmission scheme for use in the transmission signal processing unit and reporting information about the selected transmission scheme to the other node, and setting the transmission scheme for use in the transmission signal processing unit and the reception signal processing unit; and a switching unit for switching, after the information about the transmission scheme selected by the transmission scheme determination part is transmitted to the other node, connection of the transmission signal processing unit and the reception signal processing unit to the network.

As described above, in the fourth aspect, even if the transmission scheme is changed in each node, the information about the transmission scheme for use is transmitted to another node, thereby accurately correcting the delay to be applied in order to reduce the difference in reaching time of data that should simultaneously reach respective destinations.

According to a fifth aspect, in the fourth aspect, the central processing unit receives the information about the transmission scheme selected by the transmission scheme determination part, and calculates a delay time for correcting the reaching time of the data.

As described above, in the fifth aspect, only with transmission of the information about the transmission scheme, the delay time can be correctly calculated by the central processing unit.

These and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, described below is one embodiment of the present invention.

Figure 1:
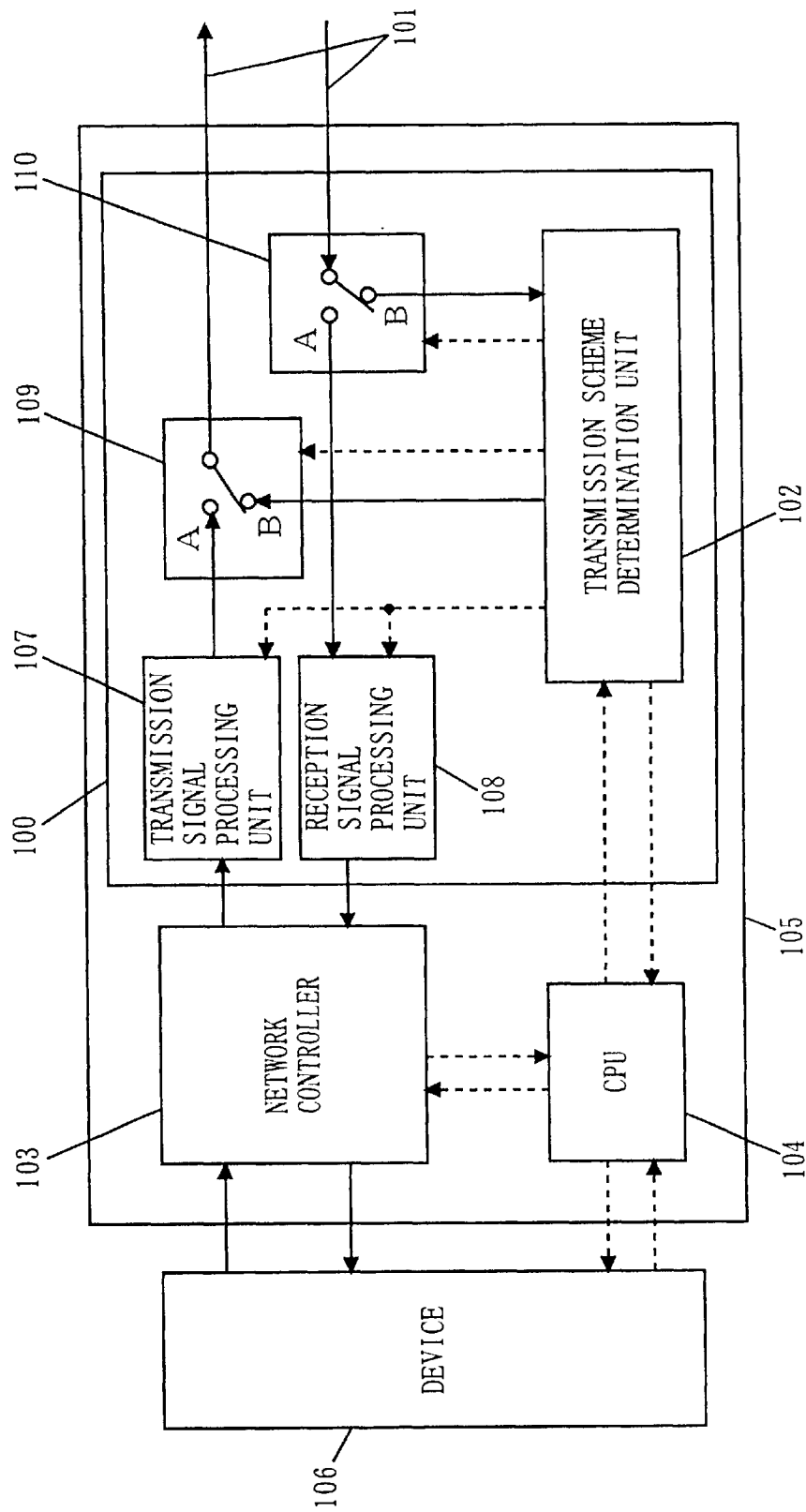
FIG. 1 is a block diagram showing a communications device according to one embodiment of the present invention.

FIG. 1 is a block diagram showing a communications device according to one embodiment of the present invention. In FIG. 1, a communications device 105 forms a node, coupled to other nodes via a network 101 for communications and connected to a device 106 such as a CD player. Note that dotted arrows in the drawing represent flows of control signals. Also, such other nodes are the same in structure as the node formed by the communications device 105, although devices connected thereto are different. An example connection of the nodes will be described later. Also, the network 101 is typically implemented by a wired network for transmitting electrical signals, but may be an optical fiber for transmitting optical signals or a wireless network.

Furthermore, the communications device 105 of FIG. 1 includes a network interface unit 100, a network controller 103, and a CPU 104.

The network controller 103 transmits/receives data to/from the device 106, and also to/from the devices connected to the other nodes. The CPU 104 carries out various communications with the network controller 103, the device 106, and others, for controlling them.

The network interface unit 100 includes a transmission signal processing unit 107, a reception signal processing unit 108, a transmission scheme determination unit 102, and first and second switches 109 and 110.

The transmission signal processing unit 107 converts data outputted from the network controller 103 into data in a transmission format appropriate for use over the network 101. The reception signal processing unit 108 converts data in the transmission format received through the network 101 into data processable by the network controller 103. The transmission scheme determination unit 102 determines the transmission scheme used between nodes, such as various modulation/demodulation schemes using variations in amplitude or phase, and multilevel schemes.

The first and second switches 109 and 110 each have a contact A and a contact B. Based on a control signal from the transmission scheme determination unit 102, each switch changes the connection to either one of the contacts. The first switch 109 changes the connection of the network 101 to either one of the transmission signal processing unit 107 (contact A side) and the transmission scheme determination unit 102 (contact B side). The second switch 110 changes the connection of the network 101 to either one of the reception signal processing unit 108 (contact A side) and the transmission scheme determination unit 102 (contact B side). Note that the contacts described herein may be the electrical ones or the physical ones, and also the logical ones or the virtual ones.

At power-on or reset for initialization, the first and second switches 109 and 110 are connected to the contact B side. Similarly, assume herein that the switches of the other nodes coupled via the network 101 are also connected to the contact B side. Under this assumption, the transmission scheme determination units of the nodes are all coupled to each other via the network 101.

Figure 2:
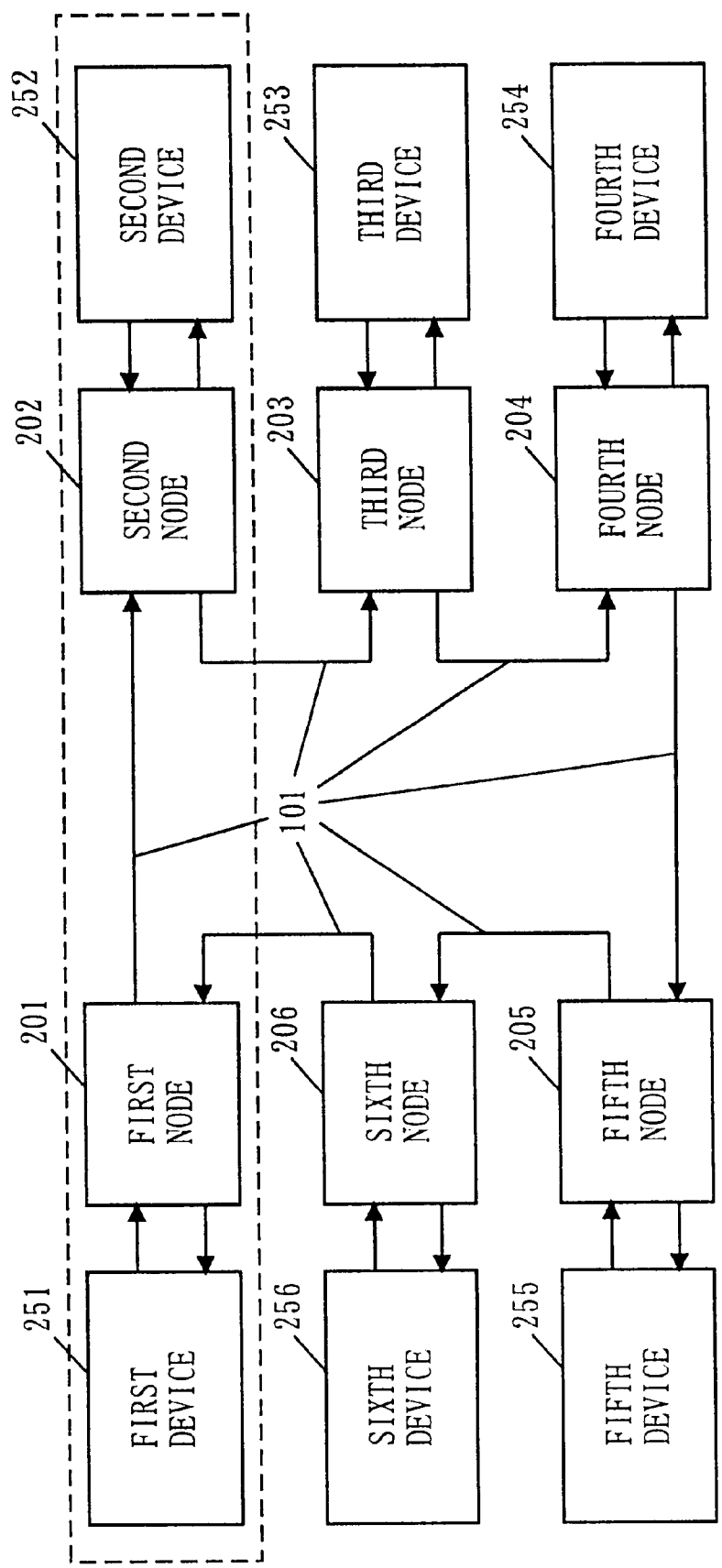
FIG. 2 is a block diagram showing an example communications system according to one embodiment of the present invention.
Figure 8:
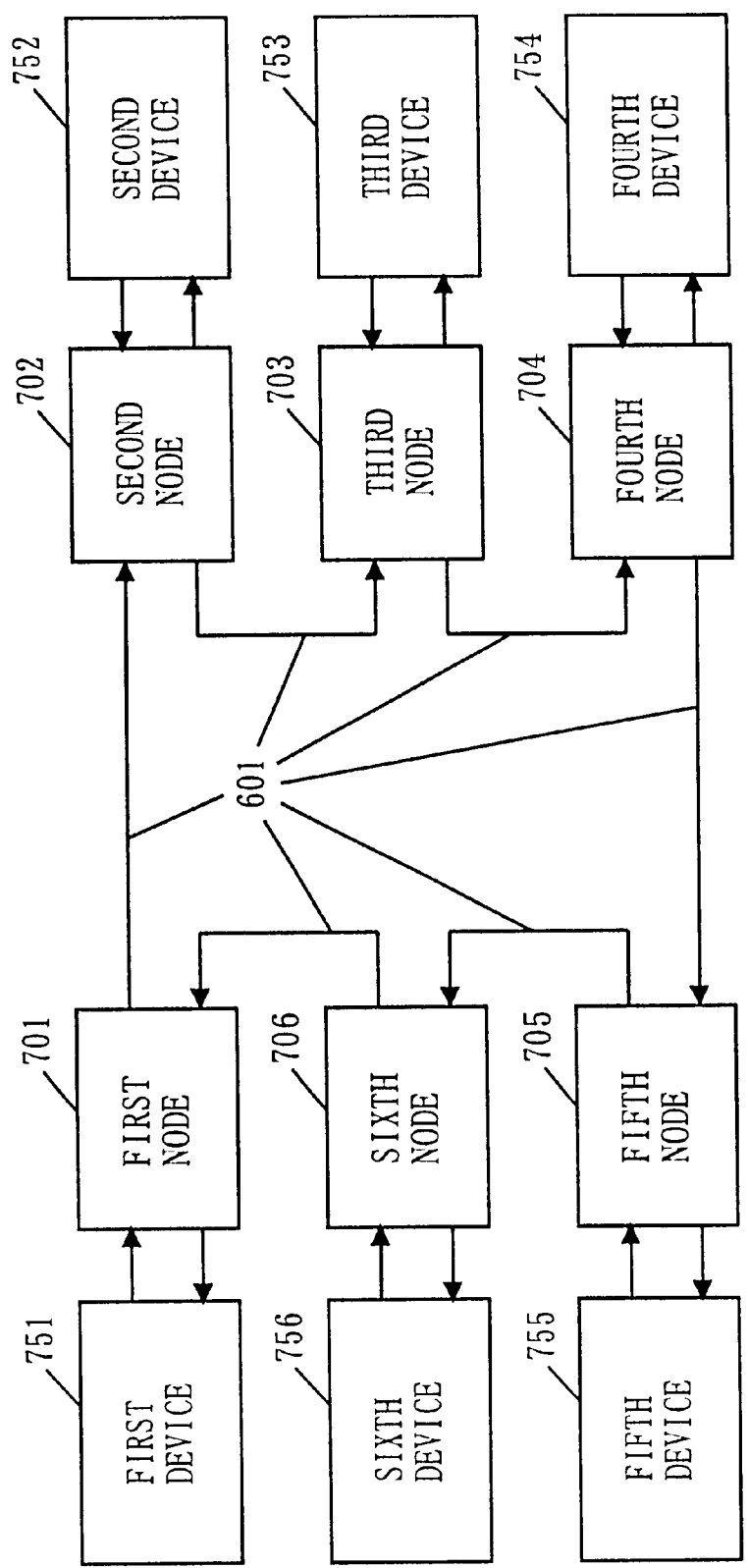
FIG. 8 is a block diagram illustrating an exemplary case where six nodes similar in structure to a communications device 604 shown in FIG. 7 are coupled to each other, forming a ring-type network.

Here, one example connection of the nodes is described with reference to the drawing. FIG. 2 is a block diagram illustrating one example communications system according to one embodiment of the present invention. In FIG. 2, the communications system includes first to sixth nodes 201 to 206 each similar in structure to the communications device 105 of FIG. 1, the network 101 coupling these nodes to each other in a ring shape, and first to sixth device 251 to 256 connected to each corresponding nodes. The connection of these components is exactly the same as that in the conventional system shown in FIG. 8, and therefore not described herein. Also, assume herein that the first to sixth devices 251 to 256 of FIG. 2 are exactly the same in structure as the first to sixth devices 751 to 756 described above with reference to FIG. 8.

Figure 3:
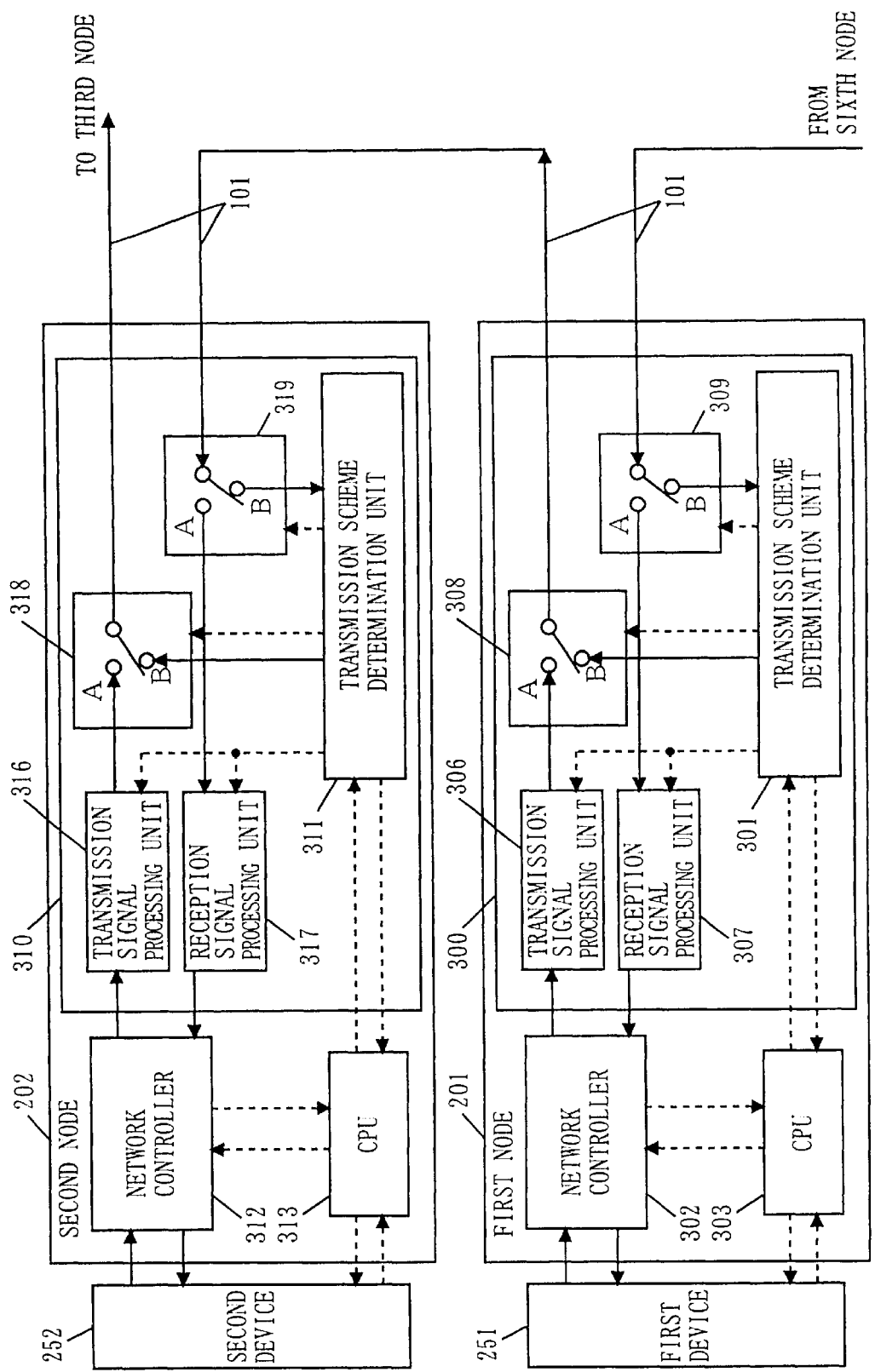
FIG. 3 is a block diagram showing the detailed structure and the state of connection of first and second nodes 201 and 202 at power-on or reset for initialization.

Described next is the operation of the communications system. FIG. 3 is a block diagram showing the detailed structure and the state of connection of the first and second nodes 201 and 202 at power-on or reset for initialization. FIG. 3 corresponds to a dotted box that appears in FIG. 2. The first and second nodes 201 and 202 are the same in structure as the communications device 105 of FIG. 1, and therefore not described herein.

In the communications system, a node having a highest priority (hereinafter referred to as master node; the first node 201, for example) sends information about the transmission scheme to the adjacent node (here, the second node 202). Such information includes, for example, a scheme selected for use from the predetermined modulation/demodulation schemes such as PSK (Phase Shift Keying) and QAM (Quadrature Amplitude Modulation), and digits in multilevel notation such as quaternary or octal notation. Assume herein that, for each transmission scheme, factors causing signal delay are known in advance. Such factors include, by way of example only, processing time required for processing a transmission signal, processing time required for processing a reception signal, and processing time in the network controller.

Figure 4:
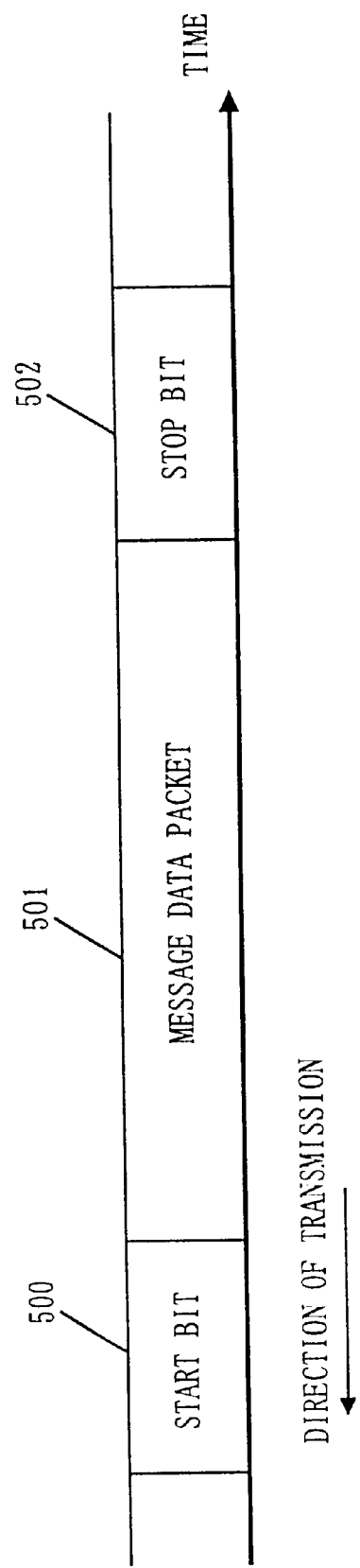
FIG. 4 is a schematic diagram showing an example message data outputted from a transmission scheme determination unit.

Here, several types of communications techniques can be suggested for transmitting, from the first node 201 to the second node 202, the information about the transmission scheme. FIG. 4 is a schematic diagram showing one example message data outputted from the transmission scheme determination unit. A message data 501 shown in FIG. 4 is preceded by a start bit 500 and followed by a stop bit 502, and transmitted through a communications technique generally called start-stop synchronization. The start-stop synchronization is often used in serial communications between CPUs, and described in detail in, for example, "Basics and Practices of Micro Computer Data Transmission", Seiichi Miyazaki, CQ publishing, published in 1984, pp. 23–26.

Alternatively, the transmission scheme to be used first at power-on or reset for initialization may be determined in advance. In this case, with this transmission scheme to be used first, the transmission scheme determination unit of each node sends information about a transmission scheme to be used next.

Figure 5:
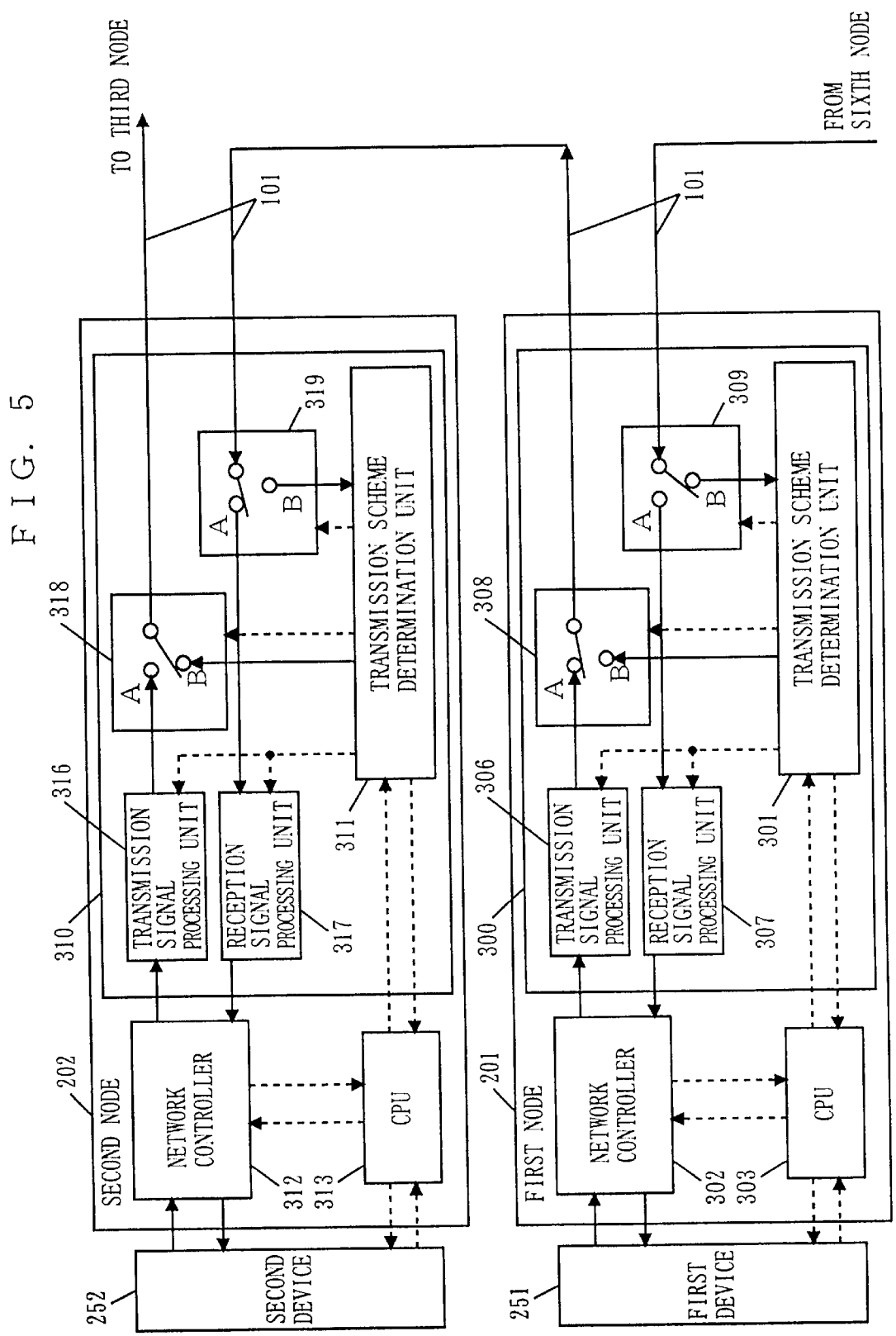
FIG. 5 is a block diagram showing the state where a first switch 308 and a second switch 319 are both switched to a contact A.

As such, when the information about the transmission scheme is sent from the first node 201 to the second node 202, the first switch 308 in the first node 201 and the second switch 319 in the second node 202 both connected to the contact B side are switched to the contact A side by a control signal from the corresponding transmission scheme determination units 301 and 311, respectively. FIG. 5 is a block diagram showing the state where the first switch 308 and the second switch 319 have been both switched to the contact A side.

As shown in FIG. 5, in the first node 201 that has sent the information about the transmission scheme, the first switch 308 disconnects a transmission circuit of the transmission scheme determination unit 301 from the network 101, and connects the transmission signal processing unit 306 to the network 101. Also, the transmission scheme determination unit 301 so controls as that, simultaneously when coupled to the network 101 or before transmitting a signal coming from the network controller 302, the transmission signal processing unit 306 carries out transmission using the transmission scheme whose information has been reported to the second node 202.

Note that the second switch 309 is still connected to the contact B side. This indicates that the transmission scheme determination unit 301 is in waiting state for receiving the information about the transmission scheme coming from the sixth node 206.

Furthermore, in the second node 202 that has received the information about the transmission scheme, the second switch 319 disconnects a reception circuit of the transmission scheme determination unit 311 from the network 101, and connects the reception signal processing unit 317 to the network 101. Also, the transmission scheme determination unit 311 so controls as that, simultaneously when coupled to the network 101 or before receiving a signal bound for the network controller 312, the reception signal processing unit 317 carries out reception using the transmission scheme whose information has been reported from the first node 202.

Next, the information about the transmission scheme is similarly sent from the second node 202 to the third node 203. Then, in the second node 202 that has sent the information about the transmission scheme, the first switch 318 disconnects the transmission scheme determination unit 301 from the network 101, and prepares for data transmission/reception to/from another node. Thereafter, the information about the transmission scheme is sent to the third node 203, the fourth node 204, the fifth node 205, the sixth node 206, and then to the first node 201.

As such, if the transmission scheme for use between the nodes are known, the delay time between the nodes can be easily known because the delay time corresponding to each transmission scheme is known, as described above. Therefore, if the positional relation between a transmission node transmitting transmission data and a reception node receiving the data and the node(s) located on a route between the transmission node and the reception node are known, the delay times between the nodes on the route are added together. By correcting the delay time obtained by such addition, the difference in data reaching time can be easily reduced.

Here, to find the position of the reception node viewed from the transmission node, the following structure may be used, for example. The message data of FIG. 4 outputted from the master node has a node position number added thereto. The initial value of the node position number is typically 0. When receiving the message data, the adjacent node adds 1 to the node position number included in the message data, and outputs, as a set, the new node position number and the information about transmission data to the next adjacent node. By repeating such processing, the information about the nodes can be accumulated. Thus, the positional relation among the nodes can be found.

Needless to say, the node position number may be added to any data other than the message data. In general, the network controller can know, through ordinary communications, at which position its own node is located on the network.

Therefore, based on the positional relation among the nodes, it is possible to know that, in the example of FIG. 2, located between the third node 203 having a right speaker connected thereto and the fifth node 205 having a left speaker connected thereto is the fourth node 204. Thus, when audio for the right speaker should be reproduced in the third node 203, delay to be applied can be obtained by adding the delay time between the third node 203 and the fourth node 204 and the delay time between the fourth node 204 and the fifth node 205. With the applied delay, the audio for the right speaker is reproduced at the same time when the audio for the left speaker connected to the fifth node 205 is reproduced.

Specifically, the information about the transmission scheme determined by the transmission scheme determination unit is transmitted to the CPU 104, which calculates the actual delay time by using a correspondence table or a formula included in the received information, for example. Also, as stated above, the CPU 104 can know the position of the reception node viewed from the transmission node. Thus, for example, the first node 201 (master node) reports the delay time at the time of audio reproduction to the third node 203. Instead of the delay time itself, a node number of the node located on the data transmission route and the information about the transmission scheme in use may be reported. The CPU of the third node 203 controls the network controller incorporated therein so that the network controller applies the reported or calculated delay time. Alternatively, the CPU may sent the information about the delay time to the device connected to that node, and controls the device so that the device applies the delay time at the time of audio reproduction. Thus, the delay time can be accurately corrected so that the difference in data reaching time between the right and left speakers can be reduced.

Note that the number of nodes is six in the communications system of FIG. 2, but this is not restrictive. Also, the master node may be any node other than the first node 201. Furthermore, in the communications system of FIG. 2, all nodes have the same structure as that of the communications device of FIG. 1. However, one node having such structure is sufficient among the nodes constructing the communications system in which the data reaching time can be flexibly changed.

Also, the device may be of any type as long as capable of carrying out communications over a network. For example, the first device 251 may be implemented by a CD player, an FM stereo broadcasting receiver, a storage medium such as a hard disk or memory that records digital audio. In any case, it is possible to accurately correct the delay time in order to reduce the difference in data reaching time.

Figure 6:
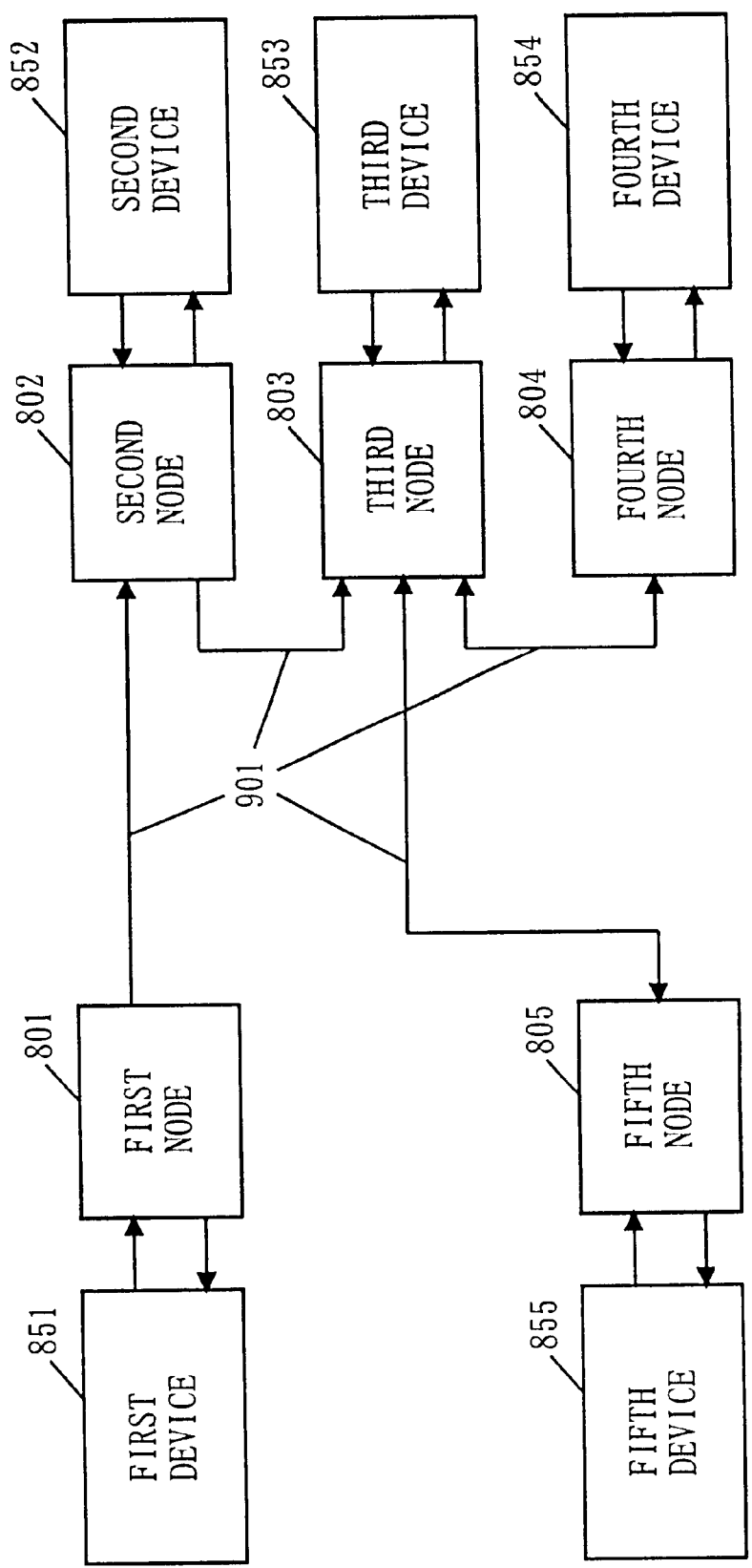
FIG. 6 is a block diagram showing another example communications system having a tree-type network connection.
Figure 7:
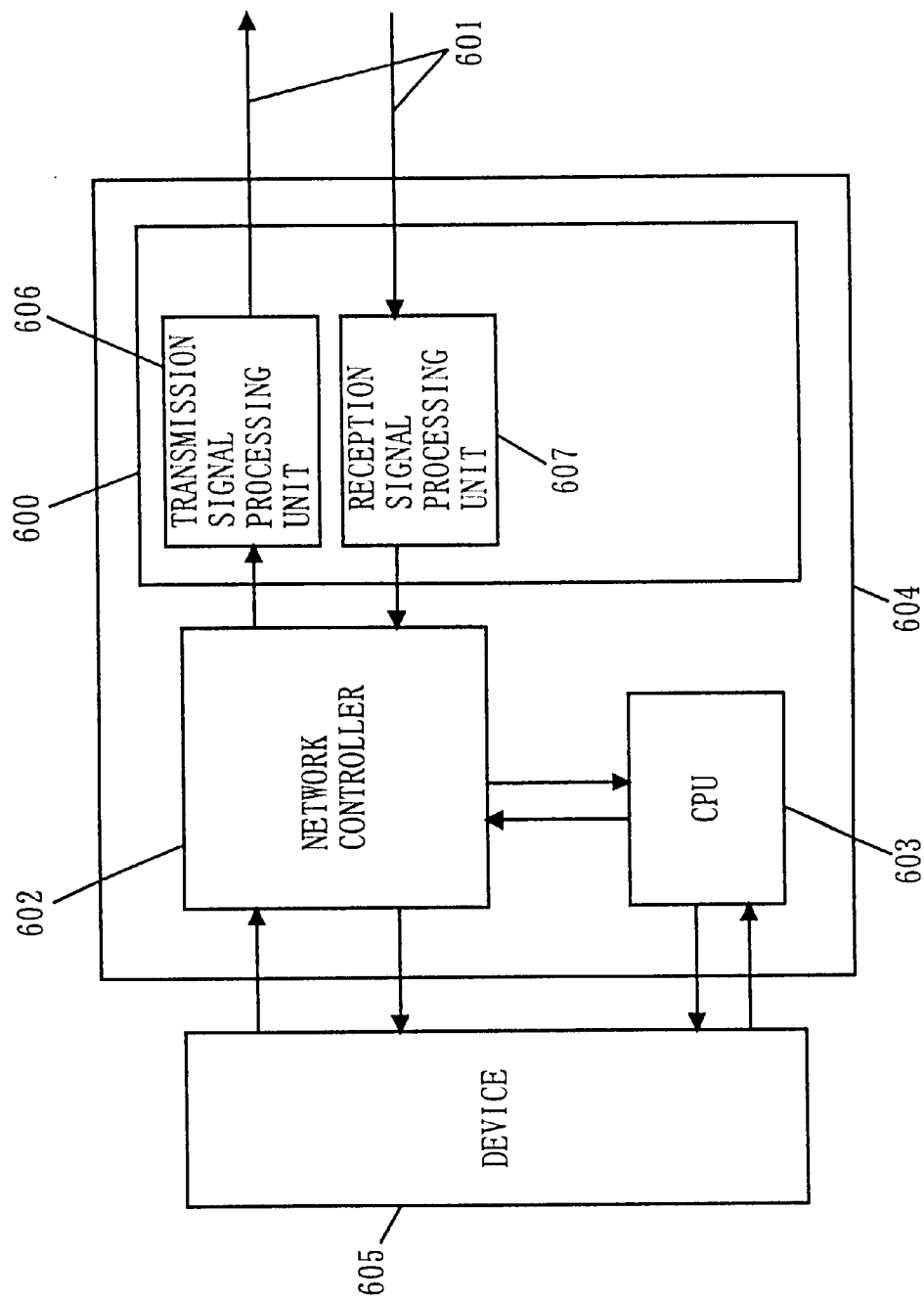
FIG. 7 is a block diagram showing a conventional communications device.

Still further, in the communications system according the embodiment of the present invention, the network may be of any type, and not restricted to the ring-type network as shown in FIG. 2. FIG. 6 is a block diagram showing another example communications system in a tree-type network. Such tree-type network is adopted by IEEE 1394, for example.

In FIG. 6, the node connection is so made via a network 901 as that a first node 801, which is the master node, is followed by a second node 802, and then by a third node 803, and then by fourth and fifth nodes 804 and 805. Even in such connection type, it is also possible to accurately correct the delay time to reduce the difference in data reaching time.

While the invention has been described in detail, the foregoing description is in all aspects illustrative and not restrictive. It is understood that numerous other modifications and variations can be devised without departing from the scope of the invention.

What is claimed is:

1. A communications system comprising a plurality of nodes including at least one transmission scheme variable node that selects a transmission scheme for use from a plurality of transmission schemes, and a network coupling the plurality of nodes, wherein said transmission scheme variable node carries out communications for transmitting, before using the selected transmission scheme, information about the selected transmission scheme to another node by using a previously set transmission scheme, thereby correcting a difference in reaching times of data that should almost simultaneously reach respective two or more different nodes.

2. The communications system according to claim 1, wherein said transmission scheme variable node includes
a network controller for communicating with a device externally provided, and controlling data communications with the other node;

a central processing unit for controlling said network controller for communications;

a transmission signal processing unit for converting data coming from said network controller into a transmission signal for transmission over said network;

a reception signal processing unit for converting a reception signal received over said network into data processable by said network controller;

a transmission scheme determination means for selecting the transmission scheme for use in said transmission signal processing unit and reporting information about the selected transmission scheme to the other node, and setting the transmission scheme for use in said transmission signal processing unit and said reception signal processing unit; and a switching unit for switching, after the information about the transmission scheme selected by said transmission scheme determination means is transmitted to the other node, connection of said transmission signal processing unit and said reception signal processing unit to said network.

3. The communications system according to claim 2, wherein said central processing unit receives the information about the transmission scheme selected by said transmission scheme determination means, and calculates a delay time for correcting said difference in reaching times of the data.

4. A communications device for carrying out communications for transmitting, before using a transmission scheme selected from a plurality of transmission schemes, information about the selected transmission scheme to another node by using a previously set transmission scheme, thereby correcting a difference in reaching times of data that should almost simultaneously reach respective two or more different nodes coupled to each other via a network, said communications device comprising:

a network controller for communicating with a device externally provided, and controlling data communications with the other node;

a central processing unit for controlling said network controller for communications;

a transmission signal processing unit for converting data coming from said network controller into a transmission signal for transmission over said network;

a reception signal processing unit for converting a reception signal received over said network into data processable by said network controller;

a transmission scheme determination means for selecting a transmission scheme for use in said transmission signal processing unit and reporting information about the selected transmission scheme to the other node, and setting the transmission scheme for use in said transmission signal processing unit and said reception signal processing unit; and a switching unit for switching, after the information about the transmission scheme selected by said transmission scheme determination means is transmitted to the other node, connection of said transmission signal processing unit and said reception signal processing unit to said network.

5. The communications device according to claim 4, wherein said central processing unit receives the information about the transmission scheme selected by said transmission scheme determination means, and calculates a delay time for correcting said difference in reaching times of the data.

* * * * *

UNITED STATES PATENT AND TRADEMARK OFFICE
CERTIFICATE OF CORRECTION

PATENT NO.    : 6,647,098 B2
DATED         : November 11, 2003
INVENTOR(S)   : Takahisa Sakai et al.

It is certified that error appears in the above-identified patent and that said Letters Patent is hereby corrected as shown below:

<u>Title page,</u>
Item [57], ABSTRACT,
Line 4, please replace "feeling strange." with -- feel strange about the audio --.
Line 4, please replace "device 105 is" with -- device is --.
Line 5, please replace "network 101 and a device 106 such" with -- network and a device such --.
Line 6, please replace "device 105 includes" with -- device includes --.
Line 7, please replace "unit 100, a network controller 103" with -- unit, a network controller --.
Line 8, please replace "device 106 and" with -- device and --.
Line 10, please replace "unit 100," with -- unit, --.
Line 11, please replace "unit 108 converts the" with -- unit convert the --.
Line 12, please replace "format appropriate" with -- format to be appropriate --.
Line 12, please replace "controller 103 and" with -- controller and --.
Line 13, please replace "network 101," with -- network, --.
Line 14, please replace "unit 102 determines" with -- unit determines --.
Line 15, please replace "switches 109 and 110 each" with -- switches each --.
Line 18, please replace "unit 102." with -- unit. --.

<u>Column 8,</u>
Line 64, please replace "node includes" with -- node includes: --.

Signed and Sealed this

Sixth Day of April, 2004

JON W. DUDAS
*Acting Director of the United States Patent and Trademark Office*